United States Patent [19]

Mérger et al.

[11] 4,319,035

[45] Mar. 9, 1982

[54] PROCESS FOR RECYCLING NOBLE METAL CATALYSTS USED FOR THE MANUFACTURE OF AROMATIC URETHANES

[75] Inventors: Franz Mérger, Frankenthal; Friedrich Towae, Ludwigshafen, both of Fed. Rep. of Germany

[73] Assignee: BASF Aktiengesellschaft, Ludwigshafen, Fed. Rep. of Germany

[21] Appl. No.: 207,057

[22] Filed: Nov. 10, 1980

[30] Foreign Application Priority Data

Nov. 14, 1979 [DE] Fed. Rep. of Germany ....... 2945961

[51] Int. Cl.³ ................ C07C 125/073; C07C 125/065
[52] U.S. Cl. ...................................... 560/25; 560/24
[58] Field of Search ................................ 560/24, 25

[56] References Cited

U.S. PATENT DOCUMENTS 2,963,444 12/1960 Nixon ................................. 252/415

OTHER PUBLICATIONS

Métayer, Chem. Absts., 47, 4290(f), 1953.

*Primary Examiner*—G. T. Breitenstein

[57] ABSTRACT

A process for the preparation of an aromatic urethane by the reaction in solution of an aromatic nitro compound or aromatic amine in the presence of an oxidation agent, with a hydroxyl compound and carbon monoxide in the presence of a noble metal catalyst, the improvement which comprises (a) treating the reaction solution, containing the noble metal catalyst, after the urethane formation is complete, with hydrogen (b) separating the noble metal in elementary form from the reaction solution, and (c) reusing the noble metal, together with a hydrohalic acid, as a catalyst.

5 Claims, No Drawings

PROCESS FOR RECYCLING NOBLE METAL CATALYSTS USED FOR THE MANUFACTURE OF AROMATIC URETHANES

BACKGROUND OF THE INVENTION

1. Field of the Invention

This invention relates to a process for reclaiming and recycling a noble metal catalyst used in the reaction of an aromatic nitro compound or aromatic amine in the presence of an oxidation agent, with a hydroxyl compound and carbon monoxide to manufacture an aromatic urethane. The noble metal catalyst is treated with hydrogen upon completion of urethane formation in the reaction solution. The precipitated noble metal is separated and, together with a hydrohalic acid, is reused as a catalyst.

2. Description of the Prior Art

The manufacture of aromatic urethanes by reaction of aromatic nitro compounds, hydroxyl group containing organic compounds and carbon monoxide in the presence of catalysts is described in German Published Application 1,568,044 (U.S. Pat. No. 3,467,694), German Published Application 2,555,557 (Great Britain Pat. No. 1,469,222), German Application 2,603,574 (Great Britain Pat. No. 1,472,243) and European Published Application, 0,000,563.

According to data in German Patent Application P 29 10 132.4, aromatic urethanes are obtained by reacting aromatic amines with hydroxyl compounds, carbon monoxide and an oxygen and/or nitrogen compound as an oxidation agent at increased pressure in the presence of catalysts.

Catalysts for both of the above processes are noble metals such as platinum, paladium, ruthenium, rhodium, osmium and iridium and chemical compounds of these noble metals, for instance, their oxides, sulfates, nitrates, halides, acetates and others. Their noble metal catalysts are preferably used together with co-catalysts such as Lewis acids, nitrogen-containing heterocyclical compounds, iron, copper or tin halides, and tertiary amines, Lewis acids and organic primary amines, ureas, biurets, allophanates or their mixtures, tin, titanium, iron, mercury, nickle, vanadium, antimony, manganese, cobalt, and/or copper compounds. Under these conditions, the noble metal catalysts are dissolved in part during the reaction so that they cannot be reclaimed from the reaction solution by simple mechanical separating methods such as decanting or filtering. If elementary, palladium deposited onto a carrier is used as catalyst, the analysis of the reaction discharge separated from the residue shows that considerable quantities of palladium are dissolved and thus discharged using this method also. Therefore, considerable losses of noble metals must be accepted for all cases which render these processes, particularly their large-scale implementation, expensive and non-economical.

A purpose of this invention was to reduce the loss of noble metal catalysts used for the processes for the manufacture of aromatic urethanes from aromatic nitro compounds or aromatic amines in the presence of an oxidant, hydroxyl compounds and carbon monoxide so that the processes become profitable and a once used noble metal catalyst can be reused for a large number of reaction cycles.

SUMMARY OF THE INVENTION

It has now been found that in a process for the preparation of an aromatic urethane by the reaction in solution of an aromatic nitro compound or an aromatic amine and oxidation agent, with a hydroxyl compound and carbon monoxide, in the presence of a noble metal catalyst, the improvement which comprises:
(a) treating the reaction solution, containing the noble metal catalyst, with hydrogen after urethane formation is complete, and
(b) separating the noble metal catalyst, precipitated in elementary form, from the reaction solution.

In a preferred embodiment, the noble metal is recycled, together with a hydrohalic acid, to the reaction solution.

DESCRIPTION OF THE PREFERRED EMBODIMENTS

The process of this invention makes it possible to keep the discharge of expensive noble metal surprisingly low. It is no longer unprofitable to use relatively large noble metal concentrations as a catalyst. Very high reaction rates are possible, with excellent selectivities, particularly for the manufacture of aromatic di- and/or polyurethanes. For the first time, the processes using a noble metal catalyst become economically feasible and there is no longer a need to use the toxic, ecologically very problematic selenium as catalyst.

In accordance with the invention, the discharge from the reaction is treated with hydrogen at a temperature between 10° C. and 160° C., preferably 50° C. to 150° C., and a pressure between 1 bar and 200 bars, preferably 2 bars to 50 bars upon completion of the urethane formation.

The optimum treatment conditions can be determined easily by means of experiment. They are found when the noble metal catalyst is reduced to elementary metal on a quantitative basis without impairing the urethane produced. Under the above-mentioned reaction conditions, 20 liters to 500 liters, preferably 20 liters to 100 liters, of hydrogen are normally required to treat one mole of noble metal catalyst.

The noble metal catalyst is transformed by the hydrogen treatment into its elementary form and is precipitated from the reaction solution from which it can be isolated easily by simple, purely mechanical separating methods, such as, decanting, centrifuging or filtering.

In a preferred embodiment, the reclaimed noble metal is recycled and reused as noble metal catalyst together with a hydrohalic acid or a compound producing hydrohalic acid under the reaction conditions. Hydrohalic acid or a hydrohalic acid forming compound is used in an amount between 1 and 200 moles, preferably 1.5 and 50 moles per mole of noble metal.

A suitable noble metal catalyst which may be transformed into its elementary form with the aid of the process according to this invention and may then be isolated includes oxides, sulfates, nitrates, acetates and/or preferably halides of noble metals such as platinum, rhodium, ruthenium, osmium, iridium and/or preferably palladium. Mixtures of catalysts also may be used. Preferably used is palladium chloride. Independent of the actual constitution or composition of the catalyst, the noble metal catalyst is usually used in catalytic quantities for the urethane manufacture in quantities of 0.001 part by weight to 10 parts by weight, preferably 0.01 part by weight to 5 parts by weight of noble metal, relative to the aromatic amine or the nitro compound.

Useful as hydrohalic acid is, in addition to hydrogen iodide, preferably hydrogen chloride and hydrogen bromide. Compounds producing hydrohalic acid include the hydrochloride and/or hydrobromide of aliphatic or aromatic tertiary amines such as trimethylamine, triethylamine, tripropylamine, dimethylaniline, pyridine and/or quinoline. Mixtures may also be used.

Preferred is hydrogen chloride which may be added to the reaction mixture either in the gaseous or in the dissolved form, such as in the alcohol corresponding with the desired urethanes.

The process for recycling the noble metal catalyst of this invention may be used for all processes for the manufacture of aromatic urethanes where an aromatic nitro compound, including aromatic nitro compounds, reacted with a hydroxyl compound, including hydroxyl compounds and carbon monoxide or an aromatic amine and an oxidation agent, including oxidation agents, is reacted with a hydroxyl compound, including hydroxyl compounds and carbon monoxide in the presence of the noble metal catalyst. Corresponding processes for the manufacture of aromatic urethanes are described, for instance, and incorporated by reference herein, in German Published Application 1,568,044, German Published Application 2,555,557, German Application 2,603,574, European Published Application 0,000,563, and German Patent Application P 29 10 132.4 as mentioned above.

Also discussed in the above-mentioned publications are the suitable starting compounds such as an aromatic nitro compound, aromatic amine and an oxidation agent, and a hydroxyl compound as well as the required reaction parameters such as the mole ratios, reaction temperature, pressure and reaction time.

The process of this invention is explained in greater detail by the following examples.

EXAMPLE 1

18.2 grams of 2,4-dinitrotoluene, 150 grams of ethanol, 150 milligrams of palladium chloride, and 1.5 grams of iron chloride were charged into a 400 milliliter steel autoclave. The air in the autoclave was replaced by nitrogen. Following this process, carbon monoxide was fed into the autoclave to a pressure of 250 bars and the mixture was heated to 180° C., while being stirred, for a period of two hours. Upon completion of the reaction, the mixture was allowed to cool and the autoclave was depressurized. Following this, hydrogen was fed into the autoclave to a pressure of 5 bars and the mixture was heated to 100° C. for one hour. After cooling, the reaction discharge was filtered, the filtrate analyzed and the insoluble residue was saved for further tests.

The analysis showed that the charged 2,4-dinitrotoluene had reacted quantitatively resulting in 22.1 grams of 2,4-bis(ethoxycarbonylamino)toluene (83.1 percent of theory) and 2.7 grams of a mixture of 2-(ethoxycarbonylamino)-4-nitrotoluene and 4-(ethoxycarbonylamino)-2-nitrotoluene (13.8 percent of theory) corresponding with an overall selectivity for urethanes of 97.0 percent. 0.27 milligram (0.3 percent) palladium was discharged with the filtered solution.

COMPARISON EXAMPLE A

Example 1 was repeated except that the reaction discharge was not treated with hydrogen following the reaction.

The analysis showed that the charged 2,4-dinitrotoluene had reacted quantitatively resulting in 21.2 grams of 2,4-bis(ethoxycarbonylamino)toluene (79.3 percent of theory) and 3.5 grams of a mixture of 2-(ethoxycarbonylamino)-2-nitrotoluene (18.0 percent of theory) corresponding with an overall selectivity for urethanes of 97.3 percent. 3.9 milligrams (4.3 percent) of palladium were discharged with the filtered solution.

EXAMPLE 2

Example 1 was repeated. The insoluble residue from Example 1 was used as catalyst and no fresh palladium chloride was added. 0.5 grams of hydrochloric acid dissolved in 20 milliliters of ethanol were added.

The analysis showed that the charged 2,4-dinitrotoluene had reacted quantitatively resulting in 22.7 grams of 2,4-bis(ethoxycarbonylamino)toluene (85.3 percent of theory) and 2.7 grams of a mixture of 2-(ethoxycarbonylamino)-4-nitrotoluene and 4-(ethoxycarbonylamino)-2-nitrotoluene (13.9 percent of theory) corresponding with an overall selectivity of urethanes of 99.2 percent. 0.27 milligram (0.3 percent) of palladium was discharged with the filtered solution.

COMPARISON EXAMPLE B

Example 1 was repeated. Instead of fresh palladium chloride, however, the insoluble residue from Comparison Example A was used as catalyst.

The analysis showed that the charged 2,4-dinitrotoluene had reacted essentially on a quantitative basis resulting in 10.3 grams of 2,4-bis(ethoxycarbonylamino)-toluene (38.7 percent of theory) and 7.6 grams of a mixture of 2-(ethoxycarbonylamino)-4-nitrotoluene and 4-(ethoxycarbonylamino)-2-nitrotoluene (39.2 percent of theory) corresponding with an overall selectivity for urethanes of 77.9 percent. 5.2 milligrams (5.8 percent) palladium was discharged with the filtered solution.

EXAMPLES 3-8

In order to show the effectiveness of the added hydrogen chloride, another test was conducted in accordance with Example 1 repeatedly recycling the catalyst reclaimed by filtration. Hydrochloric acid dissolved in ethanol was added to the fourth and fifth repetition. The reaction solutions were also treated with hydrogen according to Example 1. Prior to and following the hydrogen treatment, a sample was taken, filtered, and examined for its palladium content. The results are summarized in Table I.

The examples show that the catalyst discharge can be considerably reduced by treating the reaction mixture with hydrogen.

TABLE I

| Example No. | Catalyst % per 2,4-Dinitrotoluene | Conversion % of 2,4-Dinitrotoluene | Conversion % of 2,4-Bis-(ethoxycarbonyl amino)-toluene | Palladium Discharge % Before Treatment with $H_2$ | Palladium Discharge % After Treatment with $H_2$ |
|---|---|---|---|---|---|
| 3 | 1% $PdCl_2$ 18% $FeCl_3$ | 100 | 93 | 5.4 | 0.2 |
| 4 | Residue of 3 | 100 | 42 | 3.7 | 0.1 |

TABLE I-continued

| Example No. | Catalyst % per 2,4-Di-nitrotoluene | Conversion % of 2,4-Di-nitrotoluene | Conversion % of 2,4-Bis-(ethoxycarbonyl amino)-toluene | Palladium Discharge % Before Treatment with H$_2$ | Palladium Discharge % After Treatment with H$_2$ |
|---|---|---|---|---|---|
| 5 | Residue of 4 | 100 | 3 | 1.0 | 0.1 |
| 6 | Residue of 5 | 89 | 1 | 0.8 | 0.1 |
| 7 | Residue of 6 + 10% HCl | 100 | 67 | 3.2 | 0.1 |
| 8 | Residue of 7 + 10% HCl | 100 | 64 | 3.4 | 0.1 |

EXAMPLE 9

6.7 grams of 2,4-diaminotoluene, 100 grams of ethanol, 350 milligrams of a carbon carrier loaded with 10 percent palladium and 0.5 grams of iron chloride were charged in a 400 milliliter steel autoclave. The autoclave was closed and charged with 200 bars of carbon monoxide and 50 bars of air. While being agitated, this mixture was heated to 180° C. for 2.5 hours. After reacting out, the autoclave was allowed to cool, rinsed with nitrogen and depressurized. After taken a sample (palladium sample 1), hydrogen was fed into the autoclave to a pressure of 4 bars and the mixture was subsequently heated to 100° C. for one hour. After cooling, the reaction discharge was filtered and the filtrate analyzed (palladium sample 2).

The analysis showed that the charged 2,4-diaminotoluene had reacted quantitatively resulting in 9.4 grams of 2,4-bis(ethoxycarbonylamino)toluene (64.3 percent of theory) and 2.1 grams of a mixture of 2-amino-4-(ethoxycarbonylamino)toluene and 4-amino-2-(ethoxycarbonylamino)toluene (19.7 percent of theory) corresponding with an overall selectivity for urethanes of 84 percent.

Palladium sample 1 (filtered) contained 0.9 milligram (4.3 percent) palladium, and palladium sample 2 containing 0.02 milligram (0.2 percent) palladium.

The embodiments of the invention in which an exclusive privilege or property is claimed are defined as follows:

1. In a process for the preparation of an aromatic urethane by the reaction in solution of an aromatic nitro compound or an aromatic amine and an oxidation agent with a hydroxyl compound and carbon monoxide, in the presence of a noble metal catalyst selected from the group consisting of palladium of chemical compounds thereof, the improvement which comprises
    (a) treating a reaction solution of the urethane, containing the noble metal catalyst, with hydrogen after urethane formation is complete, and
    (b) separating the noble metal catalyst, precipitated in its elementary form, from the urethane reaction solution.
2. The process of claim 1 with an additional step of:
    (c) recycling the noble metal, together with a hydrohalic acid, to the reaction solution.
3. The process of claim 1 which comprises treating the reaction solution, containing the noble metal catalyst, with hydrogen at a temperature between 50° C. and 150° C. and a pressure between 2 bars and 50 bars.
4. The process of claim 2 wherein the hydrohalic acid is hydrogen chloride, hydrogen bromide or compounds forming hydrogen chloride or hydrogen bromide under the reaction conditions of the urethane manufacture.
5. The process of claim 1 wherein the noble metal catalyst is palladium chloride.

* * * * *